United States Patent
Burns

(10) Patent No.: US 7,302,703 B2
(45) Date of Patent: Nov. 27, 2007

(54) HARDWARE TOKEN SELF ENROLLMENT PROCESS

(75) Inventor: William Burns, Campbell, CA (US)

(73) Assignee: AOL, LLC a Delaware limited liability company, Dulles, VA (US)

( * ) Notice: Subject to any disclaimer, the term of this patent is extended or adjusted under 35 U.S.C. 154(b) by 871 days.

(21) Appl. No.: 10/168,061

(22) PCT Filed: Dec. 20, 2000

(86) PCT No.: PCT/US00/35151

§ 371 (c)(1),
(2), (4) Date: Jun. 14, 2002

(87) PCT Pub. No.: WO01/46788

PCT Pub. Date: Jun. 26, 2001

(65) Prior Publication Data

US 2003/0005291 A1    Jan. 2, 2003

(51) Int. Cl.
- H04L 9/32 (2006.01)
- H04L 9/30 (2006.01)
- G06F 19/00 (2006.01)
- H04L 9/10 (2006.01)

(52) U.S. Cl. .......................... 726/20; 726/9; 713/155; 713/173; 713/177

(58) Field of Classification Search ................ 713/194, 713/155–6, 159, 172–3, 185, 177; 726/34–36, 726/9, 17–20
See application file for complete search history.

(56) References Cited

U.S. PATENT DOCUMENTS

| | | | | |
|---|---|---|---|---|
| 4,593,384 A | * | 6/1986 | Kleijne | 365/228 |
| 4,800,590 A | * | 1/1989 | Vaughan | 713/184 |
| 4,916,738 A | * | 4/1990 | Chandra et al. | 713/159 |
| 5,267,149 A | | 11/1993 | Anada et al. | 364/408 |
| 5,396,558 A | * | 3/1995 | Ishiguro et al. | 705/67 |
| 5,784,463 A | * | 7/1998 | Chen et al. | 713/171 |
| 6,035,402 A | * | 3/2000 | Vaeth et al. | 726/2 |
| 6,088,450 A | * | 7/2000 | Davis et al. | 713/182 |
| 6,163,693 A | * | 12/2000 | Rydbeck | 455/418 |
| 6,212,635 B1 | * | 4/2001 | Reardon | 713/165 |
| 6,215,817 B1 | * | 4/2001 | Kimura | 375/220 |
| 6,223,291 B1 | * | 4/2001 | Puhl et al. | 726/28 |

(Continued)

FOREIGN PATENT DOCUMENTS

| | | |
|---|---|---|
| EP | 413 822 | 2/1991 |
| EP | 792 044 | 5/2001 |

OTHER PUBLICATIONS

Phillip Diodato, et al., "The Design of an IEEE Standard Math Accelerator Unit," IEEE Journal of Solid-State Circuits, vol. SC-20, No. 5, Oct. 1985, pp. 993-997.*

Primary Examiner—Kambiz Zand
Assistant Examiner—William S. Powers
(74) Attorney, Agent, or Firm—Michael A. Glenn; Glenn Patent Group

(57) ABSTRACT

Intelligent hardware token processors (5) are capable of sending and receiving encrypted messages. Generic initialization with non-user-specific certificates comprising public and private keys allows a certificate authority (210) to securely communicate with the hardware token. New users enrolling with the certificate server (210) have their hardware tokens securely reprogrammed with user specific certificates.

19 Claims, 9 Drawing Sheets

U.S. PATENT DOCUMENTS

| | | | |
|---|---|---|---|
| 6,240,517 B1 * | 5/2001 | Nishioka | 726/20 |
| 6,246,771 B1 * | 6/2001 | Stanton et al. | 380/286 |
| 6,356,937 B1 * | 3/2002 | Montville et al. | 709/206 |
| 6,948,061 B1 * | 9/2005 | Dierks | 713/159 |

* cited by examiner

HTP RECOGNITION TABLE

| FIELD NAME | PURPOSE | |
|---|---|---|
| HTP ID # | UNIQUE IDENTIFIER FOR EACH HTP | 130 |
| ADMIN. PIN | PIN FOR ADMINISTRATION ACCESS TO HTP | 135 |
| USER PIN | PIN THAT ALLOWS USER TO ACCESS CERTIFICATE | 140 |
| INITIALIZED | BOOLEAN INDICATES HTP IS INITIALIZED AND READY FOR USE | 145 |
| USER CERTIFICATE | PRIVATE DECRYPTION KEY THAT USER'S HTP USES TO DECRYPT MESSAGES RECEIVED FROM SERVER | 150 |
| USER CERTIFICATION NUMBER | PUBLIC KEY THAT IS USED TO ENCRYPT MESSAGES SENT TO THE HTP | 160 |
| SERVER CERTIFICATE | PRIVATE KEY THAT SERVER USES TO DECRYPT MESSAGE FROM HTP | 165 |
| SERVER CERTIFICATION NUMBER | PUBLIC KEY THAT HTP USES TO ENCRYPT MESSAGES SENT TO SERVER | 170 |
| REGISTERED | • SET TO NULL ON INITIALIZATION<br>• INDICATES DATE OF ENROLLMENT | 175 |
| USER DATA | CONTAINS USER IDENTIFICATION DATA | 180 |

FIG. 5

HARDWARE TOKEN SELF ENROLLMENT PROCESS

BACKGROUND OF THE INVENTION

1. Technical Field

The present invention pertains to the authentication of users needing access to commonly accessible data and users engaged in transactions completed over a computer network.

2. Description of the Prior Art

The traditional method of limiting access to information has relied on a password mechanism. In order to access data in a common database or data that is accessed over a network, a user must be first identified and then authenticated. Identification has normally consisted of a user name and authentication was accomplished by a password known only to the user. The security of these prior-art password based mechanisms could easily be breached if the password was compromised in some manner. Passwords could be compromised by observing the user as the user entered the password. Password are even more vulnerable to compromise through monitoring of the computer network used to convey the password back to the information source.

Other prior art protection technologies included the use of digital certificates. As sophisticated and versatile as digital certificates are, they are commonly protected by simple passwords. Again, these passwords can be captured over the network or captured through keyboard sniffers. Once the password is compromised, a file-based certificate is vulnerable to theft through innumerable means. Stealing a user's certificate and the accompanying password allows imposters to read encrypted electronic mail, access private files and engage in monetary transaction over a computer network.

Passwords have also been used to protect automation accounts that are used to provide information or perform automated tasks. These "robot accounts" are routinely used to disseminate critical information to privileged employees and agents in large companies, governmental agencies and other institutions. As such, automation accounts must be protected from compromise at all costs. In the present day, password protection mechanisms fall intolerably short of the security levels modern institutions demand.

One technique that can enhance the security aspects of user authentication is the use of hardware tokens. Traditionally, a hardware token was little more than a glorified password mechanism. The hardware token contained a non-volatile certificate that was accessed by specialized hardware connected to a user's computer. When the user needed to authenticate her identity, the hardware token was coupled to the hardware reader, the computer read the certificate, and then passed that along to the source computer.

In known hardware-based token approaches, the certificate can be protected so long as the user's computer is trustworthy Authentication credentials could still be compromised if the token is attached to a machine with inadequate host-based security. Rogue processes can infiltrate the machine and compromise the credentials. One example of this type of process is the so-called "Trojan Horse", a process that electronically mails the certificate to hundreds of users if the token is in an "unlocked" state.

Registering the hardware token is also a cumbersome task. In order to ensure the fidelity of the authentication credentials stored therein, the hardware token must be initialized by a central credential authority (CA) and then securely delivered to the user. Any other means, such as electronically delivering the certificates to the user or even postal delivery of the initialized hardware device are susceptible to compromise.

What is needed, then, is a digital certificate infrastructure that is easy to use, easy to administer and is impervious to network-based attacks such as Trojan horses and viruses. Obviously, use of a hardware-based token to store certificates provides inadequate security where host systems are not trustworthy. The digital certificate infrastructure must provide for a more resilient means not only to store the certificates, but a means to ensure security in uncontrolled environments. Finally, associating a hardware token and the certificate therein must be a distributed affair that does not rely on user specific token initialization and the inherent security risk of disseminating initialized tokens to the end users. Certificates must be initialized in an automated and encrypted manner that ensures secure identification of the user.

SUMMARY OF THE INVENTION

The present invention is a method for initializing hardware tokens useful in authenticating users attempting to access data or engaged in electronic commerce transactions. The general scheme relies on an intelligent token device called a hardware token processor (HTP). The HTP comprises an instruction unit augmented with non-volatile memory, and an interface to outside equipment. A math accelerator helps the HTP execute encryption and decryption algorithms quickly The HTP also has a metal case that is tamper evident. Tampering with the case triggers an intrusion detector that immediately clears the memory preventing compromise of encryption certificates. Only the interface is allowed to penetrate the case to enable interface with external equipment. In the preferred embodiment, an interface such as a one-wire interface (manufactured by Dallas Semiconductor) may be used.

One key aspect of the present invention is the step of pre-initializing the hardware token processors in an essentially generic fashion. Although the HTP are not strictly fungible, they only vary with unique identification numbers and encryption keys that can be randomly generated. HTPs are also initialized with random personal identification numbers for a general user and for an administrative user. HTPs can be initialized in bulk by means of a bulk-programmer driven by an initialization workstation. A certificate authority generates identification numbers for each HTP together with encryption keys. These are stored in an HTP recognition database. Alternatively, the certificate authority can drive the bulk-programmer directly, or the initialization workstation can generate the initialization data. Where the certificate authority generates the initialization data either a secure network or a non-trusted network can be used to transfer the initialization data to the initialization workstation. Alternative forms of computer readable media can be used to convey the initialization data to the initialization workstations.

Once the HTPs are initialized, they are freely distributed to potential users. When a user wants to register for authentication service, the user is allowed to submit their identification data to a certificate authority. The certificate authority then create new certificates for the HTP and uses the original certificates stored in the HTP at initialization as the means to securely convey the new certificates to the token. The new certificates also replaced the original certificates stored in the HTP recognition database that is maintained by the certificate authority. Once the HTP is programmed, Boolean flags are set to indicate the HTP has been initialized.

All initialization data for a hardware token is stored in the HTP recognition database. In the preferred embodiment, the HTP recognition database comprises fields for the HTP identifier; an administrative personal identification number and user personal identification number; an initialization Boolean, a user certificate and certification number and a server certificate and certification number Further comprising the recognition database are fields for user registration date and user identification data. These additional fields are used to store information about users when they enroll. The registration date field is set to a null value upon initialization to indicate that the HTP has not been assigned to a user. Once a user enrolls, the date of registration is recorded in the recognition database.

Before users can enroll for authentication service, they must first obtain and then install a hardware token reader on their workstations. However, installation may not always be necessary, e.g. some computers and peripherals now come with these readers preinstalled. Once the HTP reader is installed (if necessary), the user obtains an initialized token and couples it to the reader. Using a web browser augmented with a special plug-in that enables the browser to interact with the HTP reader, the new user retrieves an enrollment web page. The enrollment web page comprises the graphical user interface necessary to accept user identification data. A Java applet attached to the web page uses the browser plug-in to interact with the HTP. The user data accepted by the web page is sent to the HTP. In turn, the HTP sends an enrollment request to the certificate authority and includes the new user's identification data. Before sending the message, the HTP encrypts the message using the certificate authority's public key that was stored in the HTP during initialization. The certificate authority decrypts the message, again using the private key generated during initialization and stores the user identification data in the recognition database.

There are four types of encryption keys that comprise the certificates used in the present method. A user certificate is a private key that the HTP uses to decrypt a message it receives from the certificate authority. A user certification number is a public key that the certificate authority uses to encrypt messages it sends to the HTP. A server certificate is a private key that the certificate authority uses to decrypt a message it receives from the HTP. A server certification number is a public key that the HTP uses to encrypt messages it sends to the certificate authority. These are generated as non-user-specific certificates on initialization, but are replaced by user-specific versions during enrollment.

BRIEF DESCRIPTION OF THE DRAWINGS

The foregoing aspects are better understood from the following detailed description of one embodiment of the invention with reference to the drawings, in which:

FIG. 5 is a pictorial representation of the structure of the recognition database;

DETAILED DESCRIPTION OF THE INVENTION

Enabling the methods that comprise the present invention are hardware components manufactured by Dallas Semiconductor. Inc. Specifically, the Dallas Semiconductor, Inc. product called the iButton™ is used as an intelligent hardware token. The Dallas Semiconductor, Inc. product referred to as a BlueDot™ is used as an interface unit that allows a computer user to couple the hardware token to the user's computer. The Dallas Semiconductor, Inc. products are well suited to support the method described herein. However, alternatives are available and the present invention is not to be construed as limited only to application with the Dallas Semiconductor, Inc. hardware. Specifically, the invention concerns systems in which the HTP must be able to perform calculations, i.e. have an operating system iButtons and some smartcards can run an operating system, such as implemented in Java. Other, more simple smartcards are only memory cards and cannot be used for this application.

Figure 1:
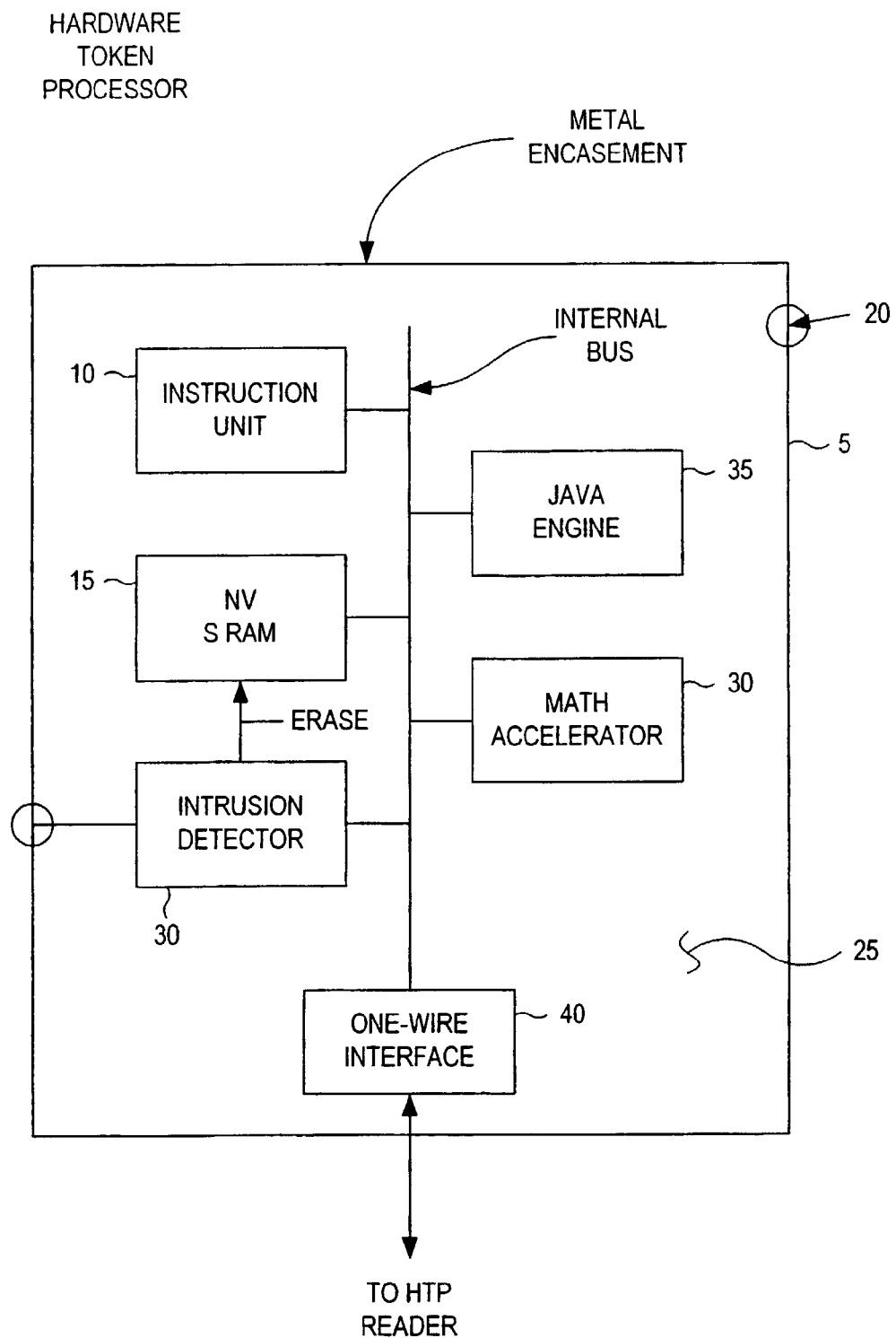
FIG. 1 is a block diagram that describes the internal structure of a generic hardware token processor (HTP) that is suitable for use with the disclosed method.

FIG. 1 is a block diagram that describes the internal structure of a generic hardware token processor (HTP) that is suitable for use with the disclosed method. The HTP 5 comprises an instruction unit 10 that executes a sequence of computer instructions stored in a non-volatile random access memory 15 (NV-RAM). The HTP can optionally comprise a math accelerator 30. The math accelerator is not specifically required, but a primary purpose for using the HTP is to enable encrypted certificate transfers between the hardware token (i.e. the HTP) and a certificate authority. The math accelerator reduces the time required to perform the encryption and decryption processes and is a useful augmentation of the HTP hardware configuration.

A metal encasement 20 is used as an integument, protecting the inner cavity 25 that houses the HTP electronic components from intrusion. In one embodiment of the invention, in the event that the metal encasement is tampered with, an intrusion detector 30 immediately erases the contents of the non-volatile RAM 15. This ensures a high level of security, since the NV-RAM 15 is used to store certificates, private keys, and other secret material that, if compromised, would breach the security of the overall security system.

An interface unit 40 penetrates the metal encasement and allows the HTP to communicate with external equipment. In the preferred embodiment, the interface unit may comprise, for example a one-wire interface that provide two-way communications with a host computer.

Figure 1A:
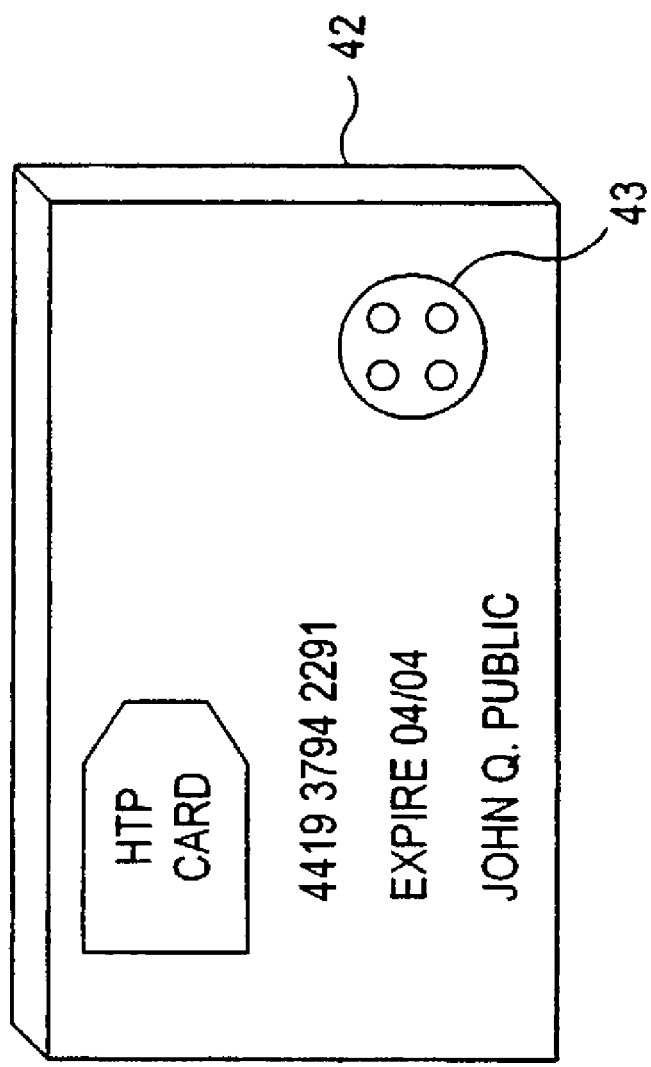
FIG. 1A is a pictorial representation of an alternative form of the HTP useful for Internet transaction authentication.

FIG. 1A is a pictorial representation of an alternative form of the HTP useful for Internet transaction authentication. In this case, the metal encasement is replaced by encapsulating the HTP electronic components into a plastic card 42 akin to a standard credit card or smart card. An interface 43 connects to the molding and allows the HTP electronic components to communicate with external equipment.

Figure 2:
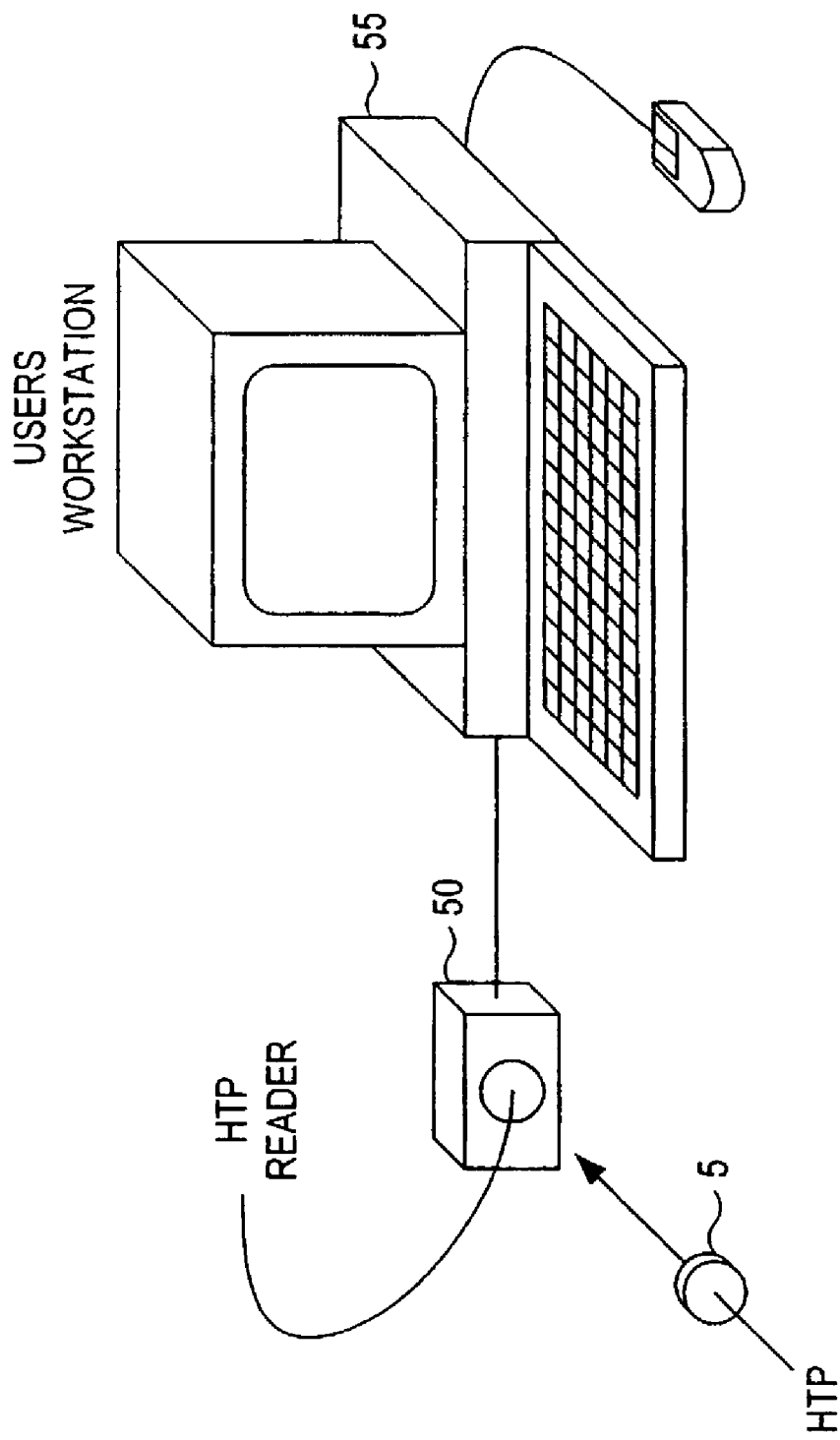
FIG. 2 is a pictorial representation of the HTP and how it interfaces to a host computer.

FIG. 2 is a pictorial representation of the HTP and how it interfaces to a host computer. The HTP 5 is coupled to an HTP reader 50. The HTP reader 50 actually allows the host computer to read and write to the HTP 5. The HTP reader interfaces to the host computer 55 by means of an interface. The interface can be any convenient interface such as a serial or parallel connection. More sophisticated interfaces, such as a computer network, can also be used.

Figure 3:
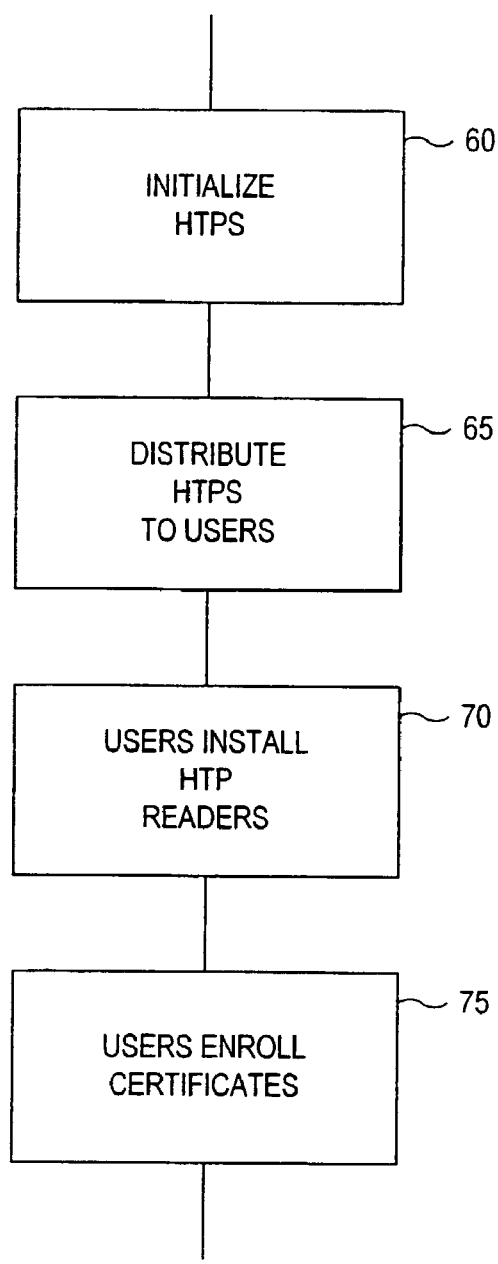
FIG. 3 is a flow diagram that depicts a method for deploying hardware tokens to a plurality of users.

FIG. 3 is a flow diagram that depicts a method for deploying hardware tokens to a plurality of users. Against the hardware background described supra, the present invention is a method for distributing the hardware tokens in a manner that is impervious to attack from ordinary computer security threats such as hackers, rogue computer processes and the like. The first step in the process is Step 60, Initialization of the hardware token. Once the hardware tokens, which are intelligent hardware token processors in the preferred embodiment, the HTPs 5 are distributed to a plurality of potential users.

The advantage of the present invention over the prior art is that the present invention allows distribution of the hardware tokens to unknown users through insecure distribution channels. In a company environment, HTPs 5 can be mailed to potential users or freely distributed in grab-bags that can be located in company cafeterias. In broader applications, such as would normally be used in Internet based transactions, the molded version of HTPs 42 can be sent to credit card holders directly using the mails.

In order to use an initialized hardware token, or HTP 5, the user must install an HTP reader (step 70) and then enroll with a certificate authority (step 75). Once the user has enrolled, the certificate authority will subsequently associate that particular user with a specific HTP. This enables authentication of that user on subsequent occasions.

Figure 4:
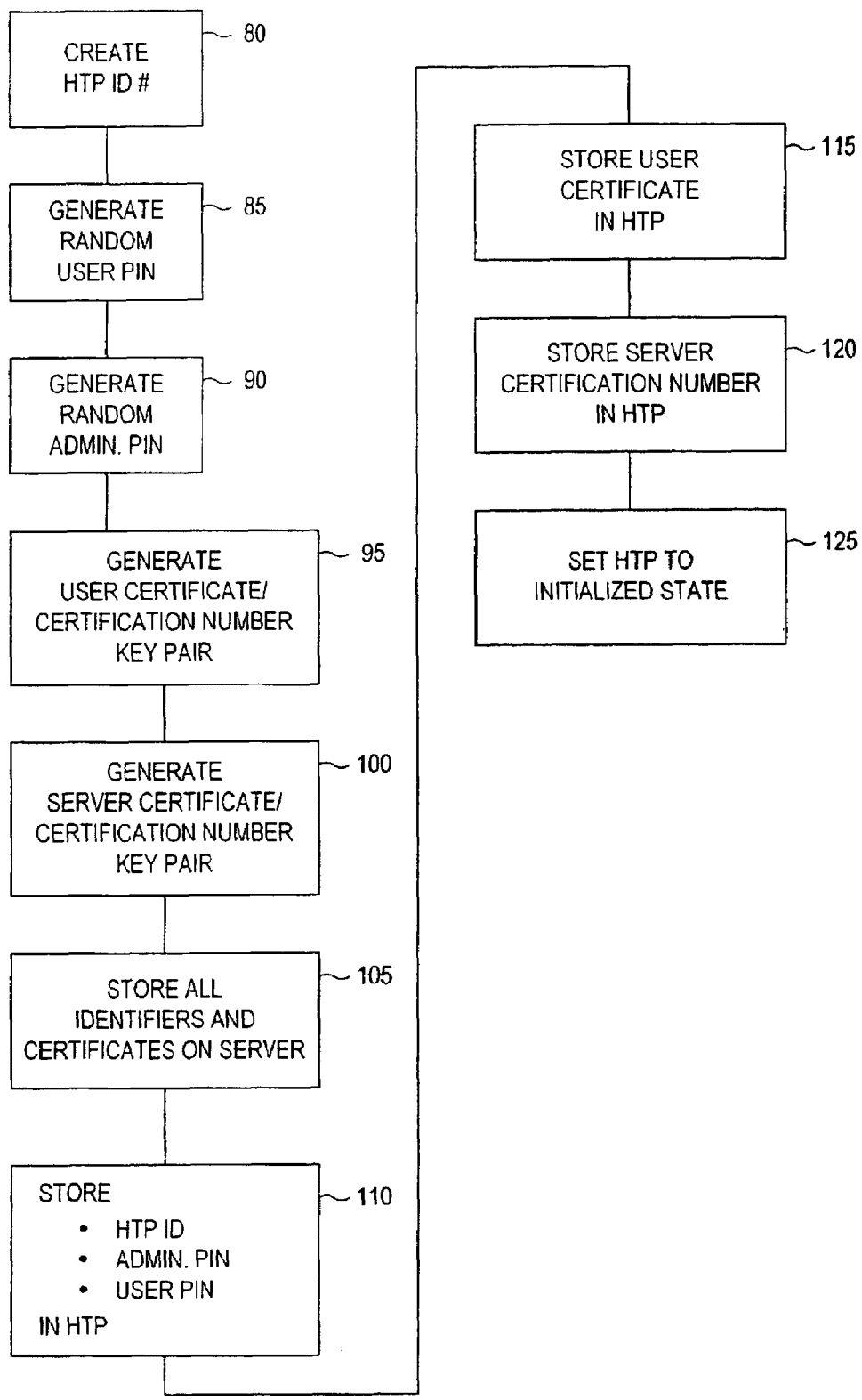
FIG. 4 is a flow diagram that depicts the process used to initialize HTPs.

FIG. 4 is a flow diagram that depicts the process used to initialize HTPs. This process is performed in a trusted server that comprises a certificate authority. The first step in initialization (step 80) is to create a unique token identifier. In the preferred embodiment, the HTP ID number is derived from a sequential numbering of HTPs. In steps 85 and 90, personal identification numbers (PINs) are randomly generated. Using yet another random process, two key pairs are generated in steps 95 and 100. A first key pair, referred to as the user certificate and certification number, are used to encrypt messages that are to be sent from a certificate authority to a user. The user, in the present embodiment, is the processor in the HTP. A second key pair, referred to as the server certificate and certification number, are used to encrypt messages that are sent from the HTP to the certificate authority. Once the certificate authority server creates the HTP ID number, personal identification numbers and certificates, these are stored in a recognition database (step 105).

In order to complete the HTP initialization process, the HTP ID number and the user and administrative PINs need to be stored on the HTP (step 110). The HTP must also be initialized with the user certificate (step 115) and the server certification number (step 120). Once the HTP is initialized, a Boolean variable stored in the HTP is set to true to indicate that the HTP has been initialized. Once this Boolean is set true, the HTP enters a cryptographic mode. In the cryptographic mode, the HTP will only interact with the certificate authority using encrypted message formats.

FIG. 5 is a pictorial representation of the structure of the recognition database. Whenever the trusted server (i.e. certificate authority) prepares to initialize an HTP, a new record is added to the HTP recognition table and each of these records comprises the following fields:

TABLE 1

Structure of Recognition Database

| Field Name | Purpose | Reference |
| --- | --- | --- |
| HTP ID# | The HTP ID number field is used to store the HTP ID number associated with the record. This is a Key Field and is used to distinguish HTP recognition records from each other. Each record, and each corresponding HTP is assigned a unique HTP ID Number. | 130 |
| Admin PIN | The Admin PIN field is used to store the administrative PIN number for the HTP that was generated during the initialization process | 135 |
| User PIN | The User PIN field is used to store the user PIN number for the HTP that was generated during the initialization process. | 140 |
| Initialized | The Initialized field is used to store a Boolean variable. The state of the initialized Boolean variable indicates if the HTP is initialized and is set to true after the HTP has been programmed with initialization values, including but not limited to the HTP ID number, admin PIN, user PIN, user certificate, and sever certification number. | 145 |
| User Certificate | The User Certificate field is used to store a private key that the HTP uses to decrypt messages it receives from the certificate authority. | 150 |
| User Certification Number | The User Certification Number field is used to store a public key that the certificate authority uses to encrypt messages that are to be sent to the HTP. | 160 |
| Server Certificate | The Server Certificate field is used to store a private key that the certificate authority uses to decrypt messages it receives from the HTP. | 165 |
| Server Certification Number | The Server Certification Number field is used to store a public key that the HTP uses to encrypt messages that it needs to send to the certificate authority. | 170 |

TABLE 1-continued

Structure of Recognition Database

| Field Name | Purpose | Reference |
|---|---|---|
| Registered | The Registered field is used to store the date on which a user enrolled for authentication service using the HTP. During initialization, the Registered field is set to a null value. | 175 |
| User Data | The User Data field is used to store information about the user who has enrolled for authentication service using the HTP. This information includes, but should not be construed as being limited to: name; address; employee number, social security number, e-mail address, and phone and fax numbers. | 180 |

Figure 6:
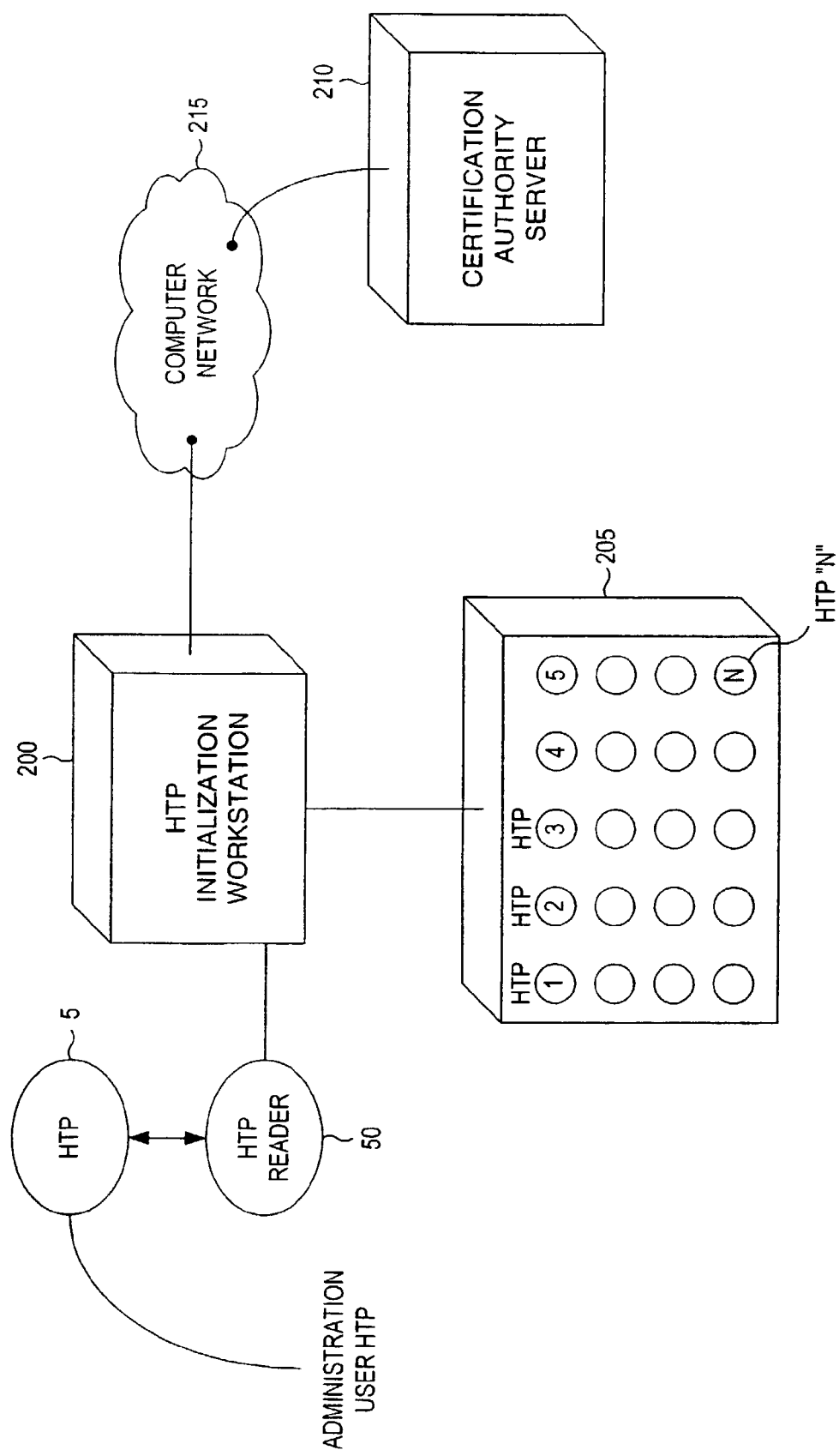
FIG. 6 is a pictorial representation of an HTP initialization suite.

FIG. 6 is a pictorial representation of an HTP initialization suite. According to the figure, a plurality of HTPs can be inserted into a gang-programmer 200. The gang programmer 200 interfaces directly with an HTP initialization workstation 205. In the preferred embodiment, the HTP initialization workstation 205 is a personal computer comprising a processor, memory, a user display and display adapter and interfaces. The HTP initialization workstation 205 is a trusted platform. The purpose of the HTP initialization workstation 205 is to intelligently receive initialization data from a certificate authority 210. The initialization data is created in the trusted environment of the certificate authority 210 and is then delivered to the HTP initialization workstation 205. In the preferred embodiment, the trusted platforms that comprise the HTP initialization workstation 205 and the certificate authority 210 communicate by way of a trusted network 215.

FIG. 6 also shows that the HTP initialization workstation 205 can further comprise an HTP reader 50 and an HTP 5. In the preferred embodiment, the administrative user performing the HTP initialization process is authenticated by coupling their personal HTP into the HTP reader 50. Only after the administrative user has been authenticated by the certificate authority is initialization allowed.

Figure 7:
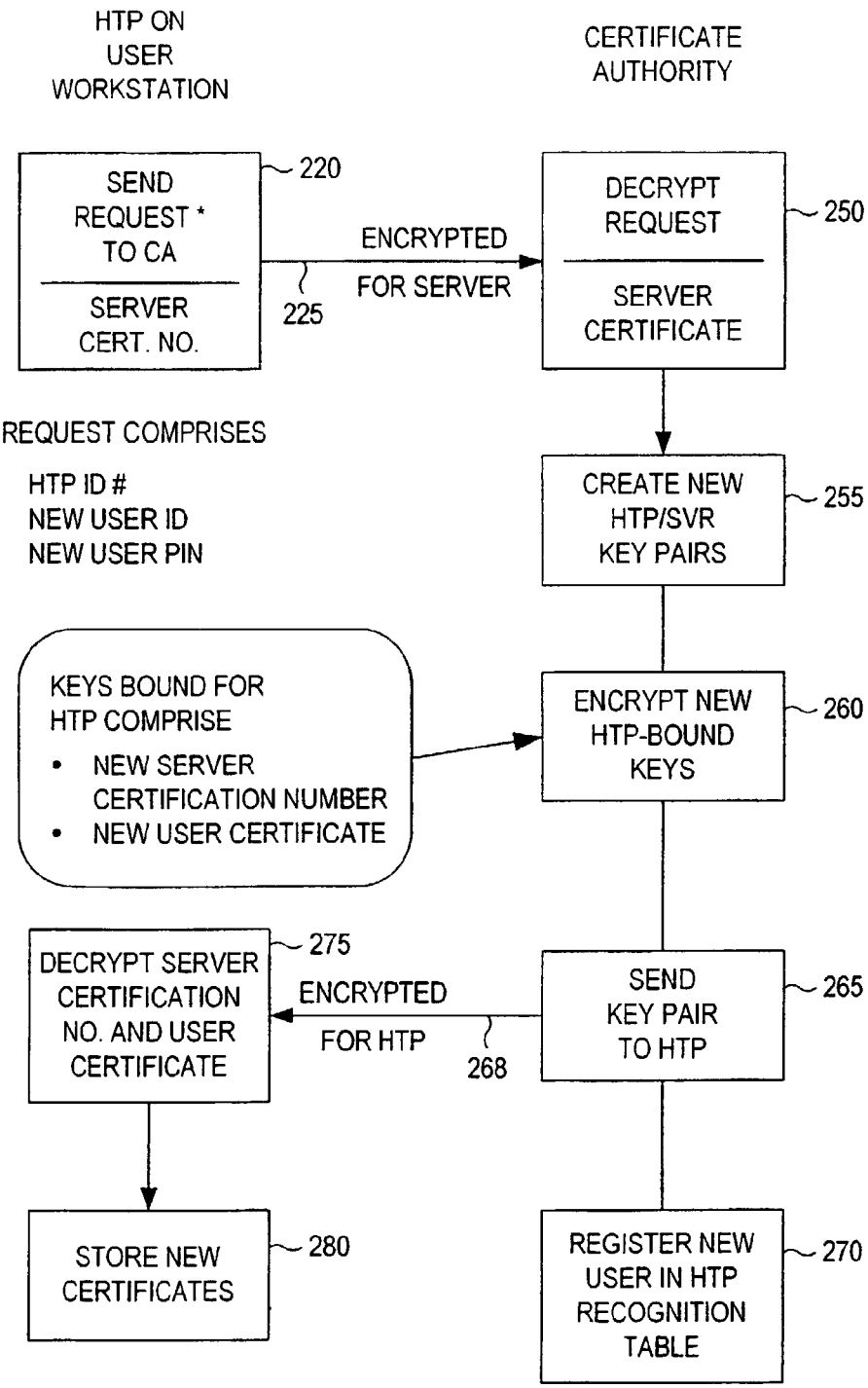
FIG. 7 is a flow diagram that depicts the HTP enrollment process.

FIG. 7 is a flow diagram that depicts the HTP enrollment process. Once HTPs are initialized, they are distributed to potential new users. Once a user obtains an HTP, that user must engage in an enrollment process that result of which affiliates that user with a particular HTP. Using the user's own workstation, or any other workstation augmented with an HTP reader 50, the user must send an enrollment request to the certificate authority (step 220). The enrollment request includes the new users personal identification data including, but not limited to: name; address; employee number, social security number, e-mail address, and phone and fax numbers. The HTP receives this information from the user workstation and then creates a message internally unto itself. The message is then encrypted by encryption algorithms stored in the HTP NV-RAM 15 These algorithms are executed by the instruction unit 10 with aid from the math accelerator 30. The encryption is based on the server certification number, a public key stored in the HTP NV-RAM 15 during initialization. The encrypted message is then transmitted to the certificate authority (step 225).

Figure 8:
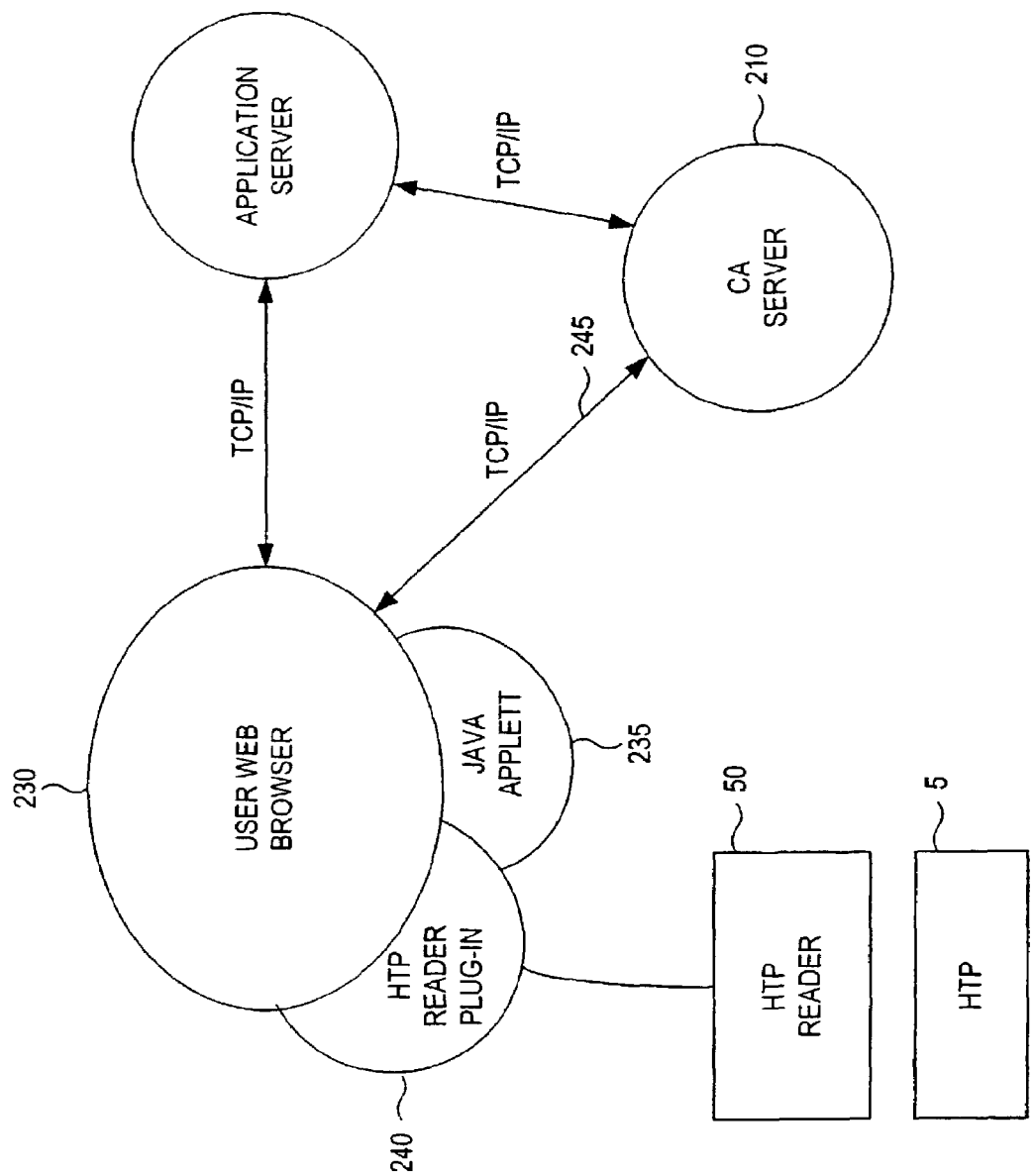
FIG. 8 is a software instantiation diagram that depicts the processes used in an enrollment process according to the present invention.

FIG. 8 is a software instantiation diagram that depicts the processes used in an enrollment process according to the present invention. In the preferred embodiment, the user that is engaged in the enrollment process uses a web browser 230 to call an enrollment web page stored on the certificate authority server 210. The browser 230 communicates with the certificate authority 210 by means of a TCP/IP connection 245. The enrollment web page comprises a collection of data entry fields together with a "submit" command button. The appearance of this web page is quite common place and will not be described here.

Augmenting the page description comprising the graphical user interface for the enrollment web page is a Java applet 235 The Java applet 235 ensures that all of the fields required in the enrollment form have been addressed by the user. After the user actuates the submit command button on the enrollment form, the Java applet 235 then collects the user identification data and directs that data to the HTP. The Java applet 235 uses a special browser plug-in 240 to communicate with the HTP 5 coupled to the HTP reader 50.

FIG. 7 shows that the certificate authority decrypts the enrollment message (step 250). In response to receiving the enrollment message from the user's HTP, the certificate authority creates new key pairs specifically for the new user (step 255). Only the new server certification number and the new user certificates are then sent to the HTP in an encrypted message. This message is encrypted using the non-user-specific certification number generated for the HTP upon initialization. The encrypted registration message is then transmitted to the HTP (steps 265 and 268). The certificate authority will then store the new user identification data in the recognition database and will replace the certificates stored there with the newly creates user-specific certificates (step 270) The HTP will then decrypt the registration message using it's initialization user certificate (step 275) and then store the new server certification number and the new user certificate in the NV-RAM 15 (step 280) thereby replacing the certificates stored there during initialization. At this point, the HTP is affiliated with the new user and has been securly reprogrammed with user specific certificates.

ALTERNATIVE EMBODIMENTS

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents. Some, but by no means all of the possible alternatives are described herein.

The present invention improves on the security afforded to a specific HTP by making first initializing each HTP with a unique identifier, and distinct identification numbers and certificates. Since, the initial certificates are replaced with user-specific certificates during the enrollment process, it is conceivable that each HTP could be initialized so that HTPs become entirely fungible. Unique identifiers could then be assigned to HTPs during enrollment. Initializing each HTP in an identical manner is an alternative to the preferred embodiment. Distribution of fungible HTPs is not as secure as the preferred method due to the fact that a user may not immediately change their personal identifier. Also, using distinct certificates helps to ensure that the HTP engaged in enrollment is the correct HTP and that no other HTP can inadvertently receive user-specific certificates that are encrypted with a distinct non-user specific certificate.

The present invention is based on TCP/IP protocols. Any suitable networking structure and protocol that provides for client-sever interaction is an acceptable alternative to TCP/IP.

The preferred embodiment includes a gang programmer for initializing a plurality of HTPs. As described supra, the gang programmer is driven by an HTP initialization workstation. The HTP initialization workstation receives initialization data from a certificate authority my way of a network. The inventor submits that the HTP initialization workstation can receive initialization data by any secure means including any form of computer readable media. Likewise, the HTP initialization workstation could receive initialization data from the certificate authority using a secure connection over a non-trusted network or it may receive encrypted that is then decrypted upon receipt.

One additional alternative is noted by the inventor, the gang programmer could also be driven by the certificate authority platform directly. This is not the preferred embodiment since the certificate authority platform may be required to service authentication requests from other users enrolled with the system.

The invention claimed is:

1. A method for initializing and distributing hardware tokens to a plurality of unknown users through insecure channels comprising the steps of:
    initializing a hardware token processor with non-user specific certificates, said initializing performed in a trusted server that comprises a certificate authority;
    after completion of said initializing step, distributing the hardware token processors to a plurality of potential users;
    allowing a new user to register a hardware token processor together with his specific user identification information;
        wherein said hardware token processor further comprises an instruction unit for performing a calculation;
    generating new certificates for the new user; and
    storing said new certificates for said new user in the hardware token processor submitted for registration by said new user;
    wherein the non-user specific certificates comprise at least: a user certificate that is a private decryption key used by the hardware token processor to decrypt messages received from said certificate authority and a user certification number that is a public key used by the certificate authority to encrypt messages that are to be sent to the hardware token processor;
    wherein the step of initializing a hardware token processor further comprises the steps of:
    creating a unique identifier for the hardware token processor;
    generating a personal identification number for a potential user in a random manner;
    generating a personal identification number for an administrative user in a random manner;
    generating a user certificate and a user certification number key pair for the hardware token processor;
    generating a server certificate and a server certification number key pair for the hardware token processor;
    storing said unique identifier, said personal identification numbers for both a potential user and an administrative user, and said user and server key pairs in a recognition database;
    storing said unique identifier, said personal identification numbers for both a potential user and an administrative user in the hardware token processor;
    storing said user certificate in the hardware token processor; and
    storing said server certification number in the hardware token processor.

2. The method of claim 1 wherein the hardware token processor comprises:
    a non-volatile random access memory, wherein said non-volatile random access memory stores both a certificate and a private key;
    an instruction unit that executes instruction sequences stored in memory;
    an encasement that houses the non-volatile random access memory and instruction unit; and
    an interface unit that penetrates said encasement and allows the instruction unit to communicate with external equipment.

3. The method of claim 2 wherein the hardware token processor further comprises:
    an intrusion detection unit that detects the compromise of the encasement and erases the contents of the non-volatile memory in response thereto.

4. The method of claim 2 wherein the hardware token processor further comprises:
    a math accelerator that is tailored to execute mathematical instructions.

5. The method of claim 2 wherein the interface unit is a one-wire interface, wherein said one-wire interface provides two-way communication with a host computer.

6. The method of claim 2 wherein said certificate comprises a non-user specific certificate on initialization and comprises a user-specific version upon replacement during enrollment.

7. The method of claim 1 further comprising the step of:
    distributing a plurality of hardware token processor interface units to potential users.

8. The method of claim 1 further comprising the step of:
    installing a hardware token reader on a plurality of user computers.

9. The method of claim 1 wherein the step of initializing said hardware token processor with non-user specific certificates is accomplished using a bulk programmer.

10. The method of claim 9 wherein the bulk programmer is controlled by a hardware token processor initialization workstation.

11. The method of claim 10 wherein the hardware token processor initialization workstation creates initialization data for each hardware token processor initialized, wherein said initialization data comprises an identification number and an encryption key.

12. The method of claim 10 wherein the hardware token processor initialization workstation obtains initialization data from an external source by means of computer readable media.

13. The method of claim 12 wherein said computer readable media is maintained in at least one of a computer network or a trusted computer network.

14. The method of claim 1 further comprising the step of:
setting an initialization Boolean flag in the hardware token processor to-indicate that the hardware token processor has been initialized.

15. The method of claim 1 wherein the recognition database comprises a unique record for each hardware token processor initialized and wherein each of said records comprises the following fields:
- a hardware token processor identifier field that is used to store a unique identifier for each hardware token processor initialized;
- an administrative personal identification number field that is used to store a randomly generated personal identification number for an administrative user;
- a user personal identification number field that is used to store a randomly generated personal identification number for a user;
- a hardware token processor initialization Boolean field that is set to true after the hardware token processor is initialized;
- a user certificate field that is used to store a private decryption key used by the hardware token processor to decrypt messages received from a certificate authority;
- a user certification number field that is used to store a public, key used by a certificate authority to encrypt messages that are to be sent to the hardware token processor;
- a server certificate field that is used to store a private decryption key used by the certificate authority to decrypt messages received from the hardware token processor; and
- a server certification number field that is used to store a public key used by hardware token processor to encrypt messages that are to be sent to the certificate authority.

16. The method of claim 15 wherein the recognition database further comprises the following fields:
- a registered field that is set to a null value upon initialization of the hardware token processor and is subsequently set to a date indicative of the date on which the hardware token processor is registered by a user; and
- a user data field that is used to store information about a user once the user has enrolled for authentication service with the certificate authority.

17. The method of claim 1, wherein said instruction unit of said token processor comprises an operating system.

18. The method of claim 1, wherein the step of initializing the hardware token processor is repeated yielding a set of fungible hardware token processors.

19. The method of claim 1, wherein the step of initializing the hardware token processor is repeated yielding a set of non-fungible hardware token processors.

* * * * *